United States Patent [19]
Muramatsu

[11] Patent Number: 6,092,636
[45] Date of Patent: Jul. 25, 2000

[54] ONEWAY CLUTCH

[75] Inventor: Kazuhiko Muramatsu, Fukuroi, Japan

[73] Assignee: NSK-Warner K.K., Tokyo, Japan

[21] Appl. No.: 09/140,343

[22] Filed: Aug. 26, 1998

Related U.S. Application Data

[63] Continuation-in-part of application No. 09/129,385, Aug. 5, 1998.

[30] Foreign Application Priority Data

| Sep. 2, 1997 | [JP] | Japan | 9-251476 |
| Oct. 20, 1997 | [JP] | Japan | 9-303375 |
| Jan. 6, 1998 | [JP] | Japan | 10-012038 |

[51] Int. Cl.[7] ............... F16D 11/00; F16D 13/00
[52] U.S. Cl. ............... 192/53.1; 192/41 R; 192/45
[58] Field of Search ........... 192/53.1, 45, 41 R, 192/44, 415

[56] References Cited

U.S. PATENT DOCUMENTS

| 3,184,020 | 5/1965 | Benson et al. | 192/45 |
| 5,372,227 | 12/1994 | Kinoshita et al. | 192/45 |
| 5,603,394 | 2/1997 | Joppeck | 192/45 |
| 5,667,046 | 9/1997 | Stanton et al. | 192/45 |

FOREIGN PATENT DOCUMENTS

| 5-58976 | 8/1993 | Japan . |

*Primary Examiner*—Charles A Marmor
*Assistant Examiner*—Tisha D. Waddell
*Attorney, Agent, or Firm*—Vorys, Sater, Seymour and Pease LLP

[57] ABSTRACT

A oneway clutch comprises an inner member, an outer race member, torque transmitting members each provided between the inner member and the outer race member to be displaced between a torque transmitting position and a non torque transmitting position, biasing members each for biasing a corresponding torque transmitting member to the torque transmitting position until a predetermined torque is applied thereto, and a retainer for retaining the torque transmitting members and the biasing members. The retainer comprises a first annular side member, a second annular side member, and pole portions for connecting the first annular side member and the second annular side member in the axial direction, the pole portions, together with the first and second annular side members, defining the apertures for mounting the block bearings. Predetermined pole portions of the retainer are provided with at least two radially protruding portions for supporting the biasing members. Each of the biasing members comprises a clip-shaped portion which is wound around one of the radially protruding portions to pinch the protruding portion and is fixed to the other of the radially protruding portions and a tongue portion which is engaged with the one of the radially protruding portions to adjust the biasing condition.

15 Claims, 10 Drawing Sheets

FIG. 4B
FIG. 4A
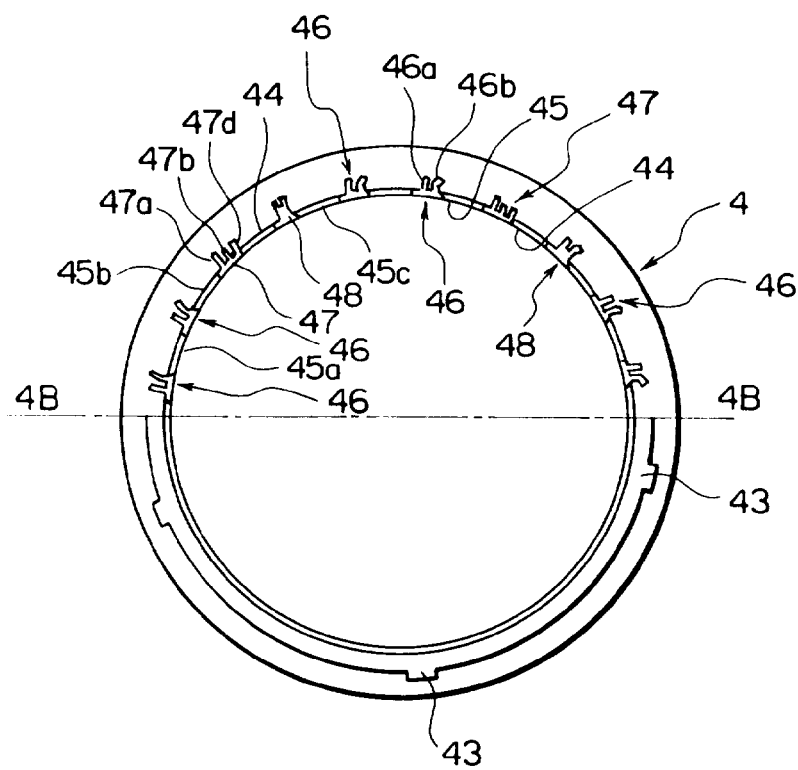
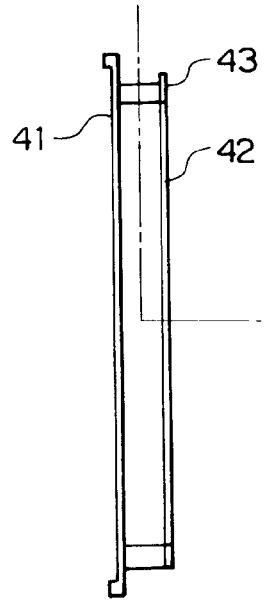
FIG. 4C
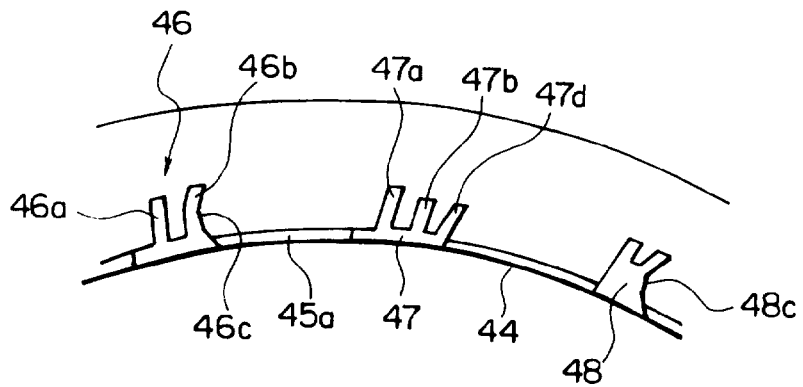

ONEWAY CLUTCH

CROSS-REFERENCE TO RELATED APPLICATION

This application is a continuation-in-part of application Ser. No. 09/129,385 filed Aug. 5, 1998.

This application claims the benefits of Japanese Application, Nos. 9-251476, 9-303375 and 10-012038 which are hereby incorporated by reference.

BACKGROUND OF THE INVENTION

1. Field of the Invention

The present invention particularly relates to a oneway clutch which is suitably used for an automatic transmission, etc., of a car.

2. Related Background Art

A oneway clutch for an automatic transmission of a car has seen increasingly widespread use in automatic transmission vehicles.

In the conventional oneway clutch device of this kind, cylindrical rollers each serving as a torque transmitting member and disposed radially between an inner member and an outer race member which is concentric with the inner member can take a torque transmitting position at which the inner member and the outer race member are united integrally and a non torque transmitting position at which the inner member and the outer race member may be rotatable relatively to each other. Such cylindrical rollers have been held by a retainer made of metal with biasing members. The retainer is fixed to the outer race member by two caulked side plates in the axial direction and through block bearings in a circumferential direction.

The metallic retainer in the conventional structure is formed of the first and second annular side members extended radially at both sides in the axial direction and pole portions connecting the first and second annular side members. In apertures defined by the first and second annular side members and the pole portions, the rollers and the biasing members for biasing the corresponding rollers to the torque transmitting positions are fitted or held, and also block bearings for positioning the retainer in the circumferential direction with respect to the outer race member are fitted or held, respectively. The positioning of the retainer in the circumferential direction with respect to the outer race member is effected by the first and second annular side members which sandwich the outer race member therebetween from the both sides thereof.

In this conventional oneway clutch, in order to retain the block bearings at the retainer, claws are integrally formed to protrude at a side plate of the retainer, and the claws are caulked into the other side plate, as disclosed, for example, in Japanese Utility Model Application No. 4-1403.

In such a conventional device, an accordion-formed leaf spring is used as the biasing member, and a plurality of these leaf springs are used to press the rollers to roller support parts of the pole portions to support the rollers.

However, when the inner race or the outer race member is rotated in a loose direction, i.e., in a non torque transmitting direction, a surplus drag torque acts on the torque transmitting members. As a result, there arises a problem that a so-called drag of the torque transmitting members is caused.

SUMMARY OF THE INVENTION

A first object of the present invention is to provide a oneway clutch in which a drag of a torque transmitting member which is a problem of the prior art is reduced to be as little as possible.

In order to achieve the above first object, there is provided, according to the present invention, a oneway clutch which comprises an inner member, an outer race member concentric with the inner member and having a predetermined number of cam surfaces on the inner periphery thereof, torque transmitting members each provided between the inner member and the outer race member to be displaced between a torque transmitting position and a non torque transmitting position on an outer race cam surface, biasing members each for biasing a corresponding torque transmitting member to the torque transmitting position until a predetermined torque is applied thereto, and a retainer for retaining the torque transmitting members and the biasing members, wherein grooves extended in the axial direction are formed at predetermined positions on the inner peripheral side of the outer race member, and respective block bearings are fitted in the grooves through apertures provided on the retainer correspondingly to the grooves in order to position the retainer in the circumferential direction. This oneway clutch is characterized in that the retainer comprises a first annular side member, a second annular side member, and pole portions for connecting the first annular side member and the second annular side member in the axial direction, the pole portions together with the first and second annular side members defining the apertures for mounting the block bearings correspondingly to the grooves of the outer race, and further defining second apertures for retaining the torque transmitting members and the biasing members, each of predetermined pole portions out of the pole portions of the retainer is provided with at least two radially protruding portions for supporting a corresponding biasing member in the circumferential direction thereof, each of the radially protruding portions is formed to be inclined in the circumferential direction, and each of the biasing members comprises a clip-shaped portion which is wound around one of the radially protruding portions of the corresponding predetermined pole portion nip this protruding portion and is fixed to the other of the radially protruding portions, and a tongue portion which is engaged with the one of the radially protruding portions to adjust the biasing condition.

A second object of the present invention is to provide a oneway clutch with a longer service life which can be assembled in a simpler process without a caulking step for mounting the block bearings as mentioned above.

In order to achieve the above second object, a oneway clutch according to a first aspect of the present invention may comprise an inner member having a raceway on the outer periphery thereof, an outer race member concentric with the inner member, torque transmitting members each disposed between the inner member and the outer race member to be displaced between a torque transmitting position and a non torque transmitting position, biasing members each for biasing a corresponding transmitting member to the torque transmitting portion until a predetermined torque is applied thereto, and a retainer for retaining the torque transmitting members and the biasing members, wherein grooves extended in the axial direction are formed at predetermined positions on the inner peripheral side of the outer race member, and respective block bearings are fitted in the grooves through apertures provided on the retainer correspondingly to the grooves in order to position the retainer in the circumferential direction. This oneway clutch is characterized in that the retainer is integrally made of plastic or synthetic resin and comprises a first annular side member, a second annular side member, and a plurality of pole portions for connecting the first annular side member and the second annular side member in the axial direction, a pair of predetermined adjacent pole portions out of the above pole portions, together with the first and second annular side members, define the apertures for mounting the block bearings correspondingly to the grooves of the outer race, and radially protruding portions are formed on at least one of the paired pole portions to be outwardly extended in the radial direction toward the apertures, so as to be bent when the block bearings are assembled and to support the block bearings after they are assembled.

A oneway clutch according to a second aspect of the present invention for attaining the aforementioned second object comprises an inner member having a raceway on the outer periphery thereof, an outer race member concentric with the inner member, torque transmitting members each disposed between the inner member and the outer race member to be displaced between a torque transmitting position and a non torque transmitting position, biasing members each for biasing a corresponding transmitting member to the torque transmitting portion until a predetermined torque is applied thereto, and a retainer for retaining the torque transmitting members and the biasing members, wherein grooves extended in the axial direction are formed at predetermined positions on the inner peripheral side of the outer race member, and respective block bearings are fitted in the grooves through apertures provided on the retainer correspondingly to the grooves in order to position the retainer in the circumferential direction, the block bearings having apertures in the axial direction. This oneway clutch is characterized in that the retainer comprises a first annular side member, a second annular side member, and a plurality of pole portions for connecting the first annular side member and the second annular side member in the axial direction, predetermined pairs of adjacent pole portions out of the above pole portions, together with the first and second annular side members, define the apertures for mounting the block bearings correspondingly to the grooves of the outer race, radially protruding portions are formed on the paired pole portions to be outwardly extended in the radial direction, the sides of the block bearings are brought into contact with the radially protruding portions to be pressed, an elastic claw is formed on at least one of the first and second annular side members of the retainer, and the elastic claw is bent when the block bearings are assembled in the retainer so as to support the block bearings after they are assembled.

BRIEF DESCRIPTION OF THE DRAWINGS

FIGS. 4A–4C are views for schematically showing a retainer according to the above embodiment, in which FIG. 4A is a front view of the retainer whose upper half is cut away, seen from the opposite side to FIG. 1 in the axial direction, FIG. 4B is a cross-sectional view taken along 4B—4B in FIG. 4A, and FIG. 4C is a partially enlarged view of the retainer.

DESCRIPTION OF THE PREFERRED EMBODIMENTS

Figure 1:
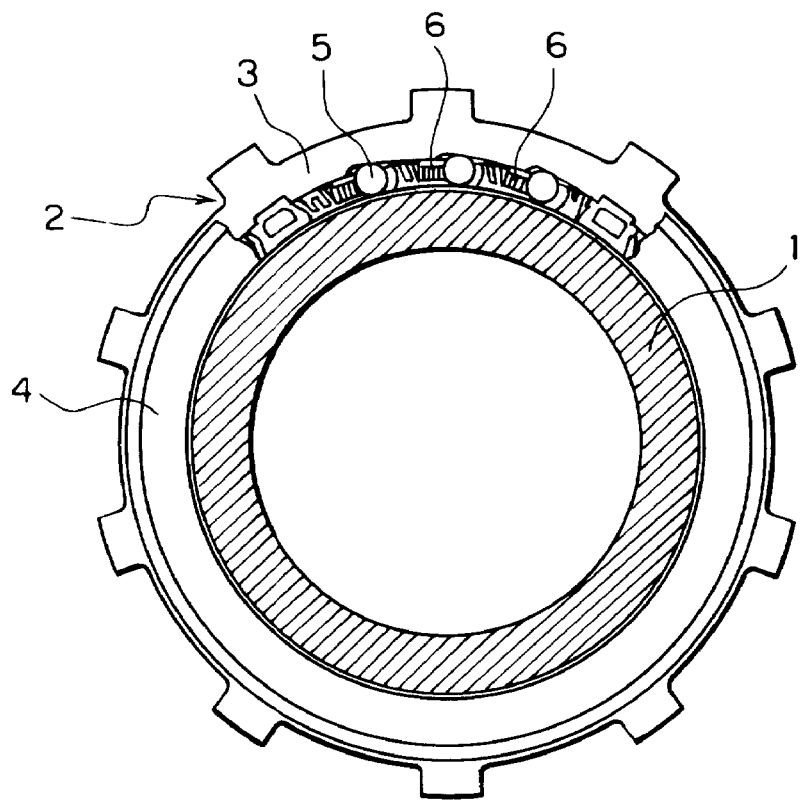
FIG. 1 is a front view of a oneway clutch, partially cut-away, according to a preferred embodiment of the present invention.
Figure 2:
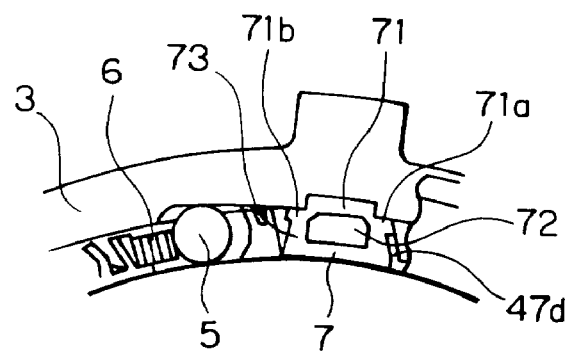
FIG. 2 is a partially enlarged view of FIG. 1.

FIGS. 1–12 are to illustrate a oneway clutch according to an embodiment of the present invention. In these drawings, an outer race-retainer assembly 2 which is concentric with an inner member 1 is fittingly mounted on the circumference of the inner member 1 serving as an inner race member. An outer peripheral surface of the inner member 1 serves as a circumferential raceway.

The outer race-retainer assembly 2 is comprised of an outer race 3, a retainer 4, rollers 5 which are retained by the retainer 4 and serve as torque transmitting members, and leaf springs 6 serving as biasing members which are in contact with the rollers 5 to press the rollers 5 with pressure. The retainer 4 is retained without play in the circumferential direction with respect to the outer race member through block bearings 7, as to be described later.

The outer race 3 is formed by press working of a metal such as sintered alloy, and the inner peripheral surface of the outer race 3 is provided with grooves 31 which are extended in the axial direction along the basic circle of the outer race and separated from each other by a predetermined angle. The inner peripheral surface of the outer race is provided also with a predetermined number of cam surfaces 32 between each two grooves 31, 31. Each of the cam surfaces 32 is a smoothly inclined surface having a deep cam surface portion 32a which has a large distance from the outer peripheral surface of the inner member 1 and a shallow cam surface portion 32b which has a small distance.

Figures 3A, 3B:
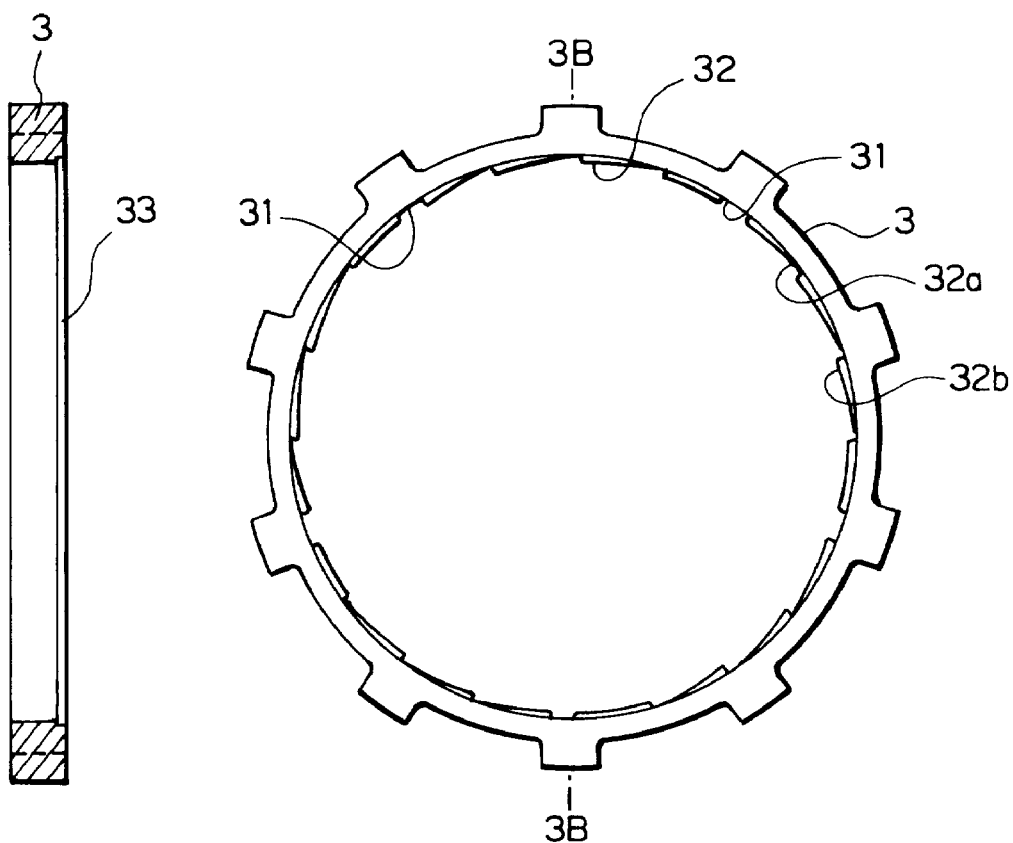
FIG. 3A is a front view schematically showing an outer race member according to the above embodiment.
FIG. 3B is a cross-sectional view taken along 3B—3B in FIG. 3A.

As shown in FIG. 3B, an annular stepped portion 33 having a slightly larger diameter than that of the basic circle is formed on one inner peripheral side surface of the outer race.

The outer diameter of the first annular side member 41 of the retainer 4 is, as shown in FIG. 4B, larger than the diameter of the basic circle of the outer race. Specifically, the outer diameter of the first annular side member 41 is sufficiently large to be contacted with the corresponding side face of the outer race 3 when the retainer 4 is assembled with the outer race 3, as described later.

The outer diameter of the second annular side member 42 of the retainer 4 is made smaller than the basic circle of the outer race 3 except at radially protruding portions 43. The radially protruding portions 43 are provided at the same angle as the axially extending grooves 31 of the outer race 3, which are described above. The outer diameter of each radially protruding portion 43 is made smaller than the diameter of the bottom of each axial groove 31.

The retainer 4 is formed of plastic or synthetic resin and, as shown in FIGS. 4A–4C, has an integral unitary structure which is comprised of the first annular side member 41 having a large diameter, the second side member 42 having a small diameter, and three kinds of pole portions 46, 47, 48 for connecting the first annular side member 41 to the second annular side member 42 in the axial direction on the inner peripheral side. The pole portion 46 comprises two radially protruding portions 46a, 46b, while the pole portion 47 comprises three radially protruding portions 47a, 47b, 47d.

Between the pole portions 47 and 48 of the retainer, first apertures 44 are formed through in the radial direction at the same angular locations as those of the axial grooves 31 of the outer race 3. The width in the circumferential direction of each first aperture 44 is larger than the width in the circumferential direction of the groove 31 of the retainer so that the block bearings 7 can be inserted through the respective first apertures 44 from the inside of the retainer when the retainer 4 is mounted at a predetermined position inside the outer race 3, whereby the heads 71 of the block bearings 7 (FIG. 2) are fitted in the respective grooves 31 of the outer race so as to position the retainer 4 with respect to the outer race 3 in the circumferential direction.

Each block bearing 7 is made of sintered alloy and is provided with an aperture 72 in the axial direction thereof. Since the retainer 4 is made of plastic, the width of each of the first apertures 44 in the circumferential direction is formed slightly smaller than the width of the body 73 in the circumferential direction of the block bearing 7, whereby the block bearing 7 is squeezed in the aperture 44 by use of the elasticity of the plastic.

Each block bearing is provided with circumferentially protruding portions 71a, 71b which are protruding from opposite sides of the bearing in the circumferential direction at the shoulder portions thereof.

In the present embodiment, the radially protruding portion 47d with a tip end inclined toward the inner side of the corresponding first aperture 44 is formed on one of the pole portions 47, 48 which define each first aperture 44 of the retainer 4 at both sides thereof in the circumferential direction. Accordingly, each first aperture 44 is defined by the protruding portion 47d and the other pole 48.

Thus, when the block bearings 7 are inserted in respective the first apertures 44 and the heads 71 of the block bearings 7 are fitted in the respective grooves 31 of the outer race to position the retainer, the tip end of each of the protruding portions 47d is brought into contact with pressure with a root portion 75 which forms a stepped portion (see FIG. 12) of the block bearing 7 to thereby press the block bearing 7 to a corner of one of the side walls of the groove 31 of the outer race obliquely upward. The retainer 4 is thus retained and held without play in the circumferential direction and the radial direction with respect to the outer race 3.

The second apertures 45a, 45b and 45c are formed between the pole portions 46 and 46, the pole portions 46 and 47, and the pole portions 48 and 46 of the retainer 4, respectively. These second apertures 45a, 45b and 45c have substantially the same size and are arranged to face the corresponding cam surface 32 of the outer race when the retainer 4 is positioned in the outer race 3.

In each of the second apertures 45a, 45b, and 45c, a roller 5 serving as a torque transmitting member and a leaf spring 6 for biasing the roller 5 are installed. More specifically, the rollers 5 are installed in respective second apertures 45a, 45b and 45c, and the rollers 5 are biased on the shallow cam surface portions 32b by the biasing members 6 which are installed in the second apertures 45a, 45b, 45c to be adjacent to and in contact with the rollers 5.

Out of the poles 46, 48 for defining one side of the second apertures 45a, 45b, 45c (the left side in FIG. 4A), portions facing the cylindrical rollers 5 are formed with recesses 46c, 48c correspondingly to the cylindrical forms of the rollers.

An end portion of each leaf spring 6 contacted with the roller 5 is also provided with a recess 61 (see FIG. 7) correspondingly to the cylindrical form of the roller 5. Since each roller 5 is thus retained in an embracing manner from the both sides in the circumferential direction, the roller 5 can be retained with a smaller biasing force, so that a so-called drag of the rollers 5 can be reduced.

Figure 5:
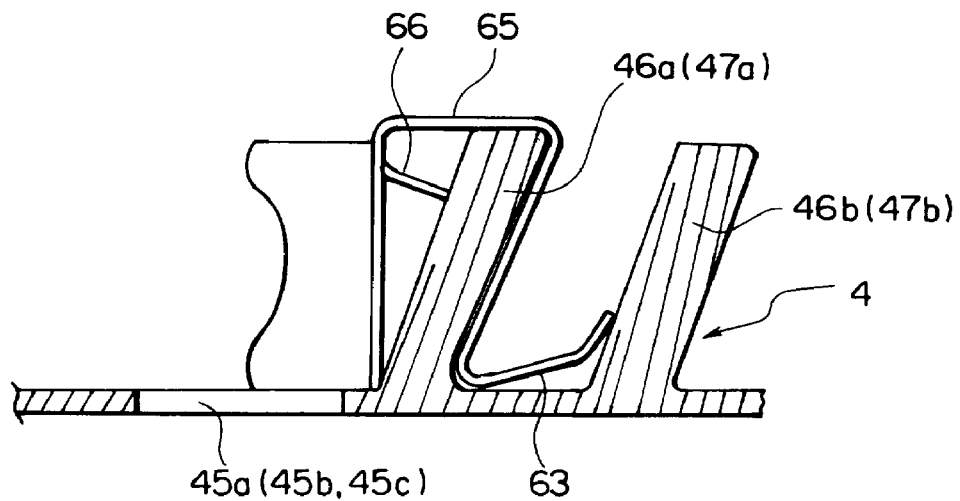
FIG. 5 is an explanatory view showing a relationship between the retainer and a leaf spring in the above embodiment.
Figure 6:
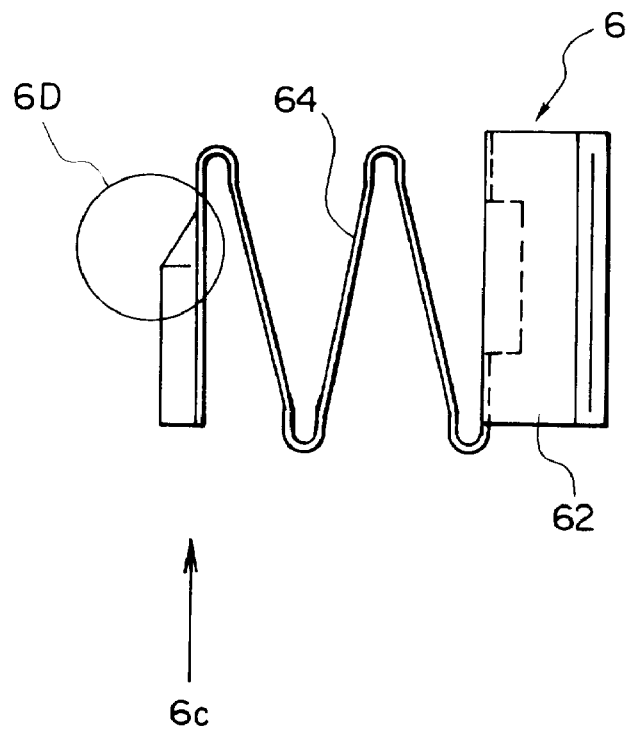
FIG. 6 is a plan view showing the spring portion of the above embodiment.
Figure 7:
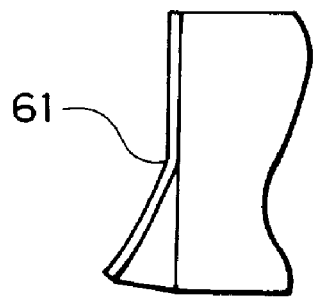
FIG. 7 is a view showing a part of the leaf spring shown in FIG. 6, from the direction indicated by the arrow 6C.
Figure 8:
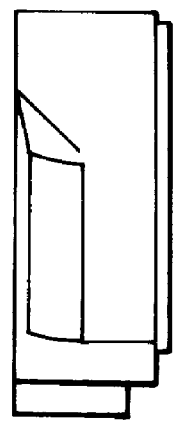
FIG. 8 is a view showing the leaf spring shown in FIG. 6, from the direction indicated by the arrow 6D.
Figure 9:
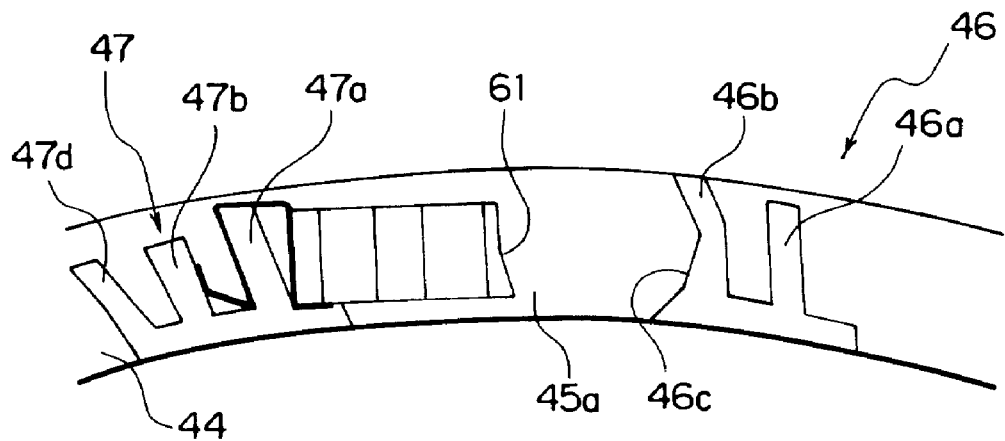
FIG. 9 is an explanatory view showing a relationship between the leaf spring and a pole portion of the retainer for supporting the leaf spring.
Figure 10:
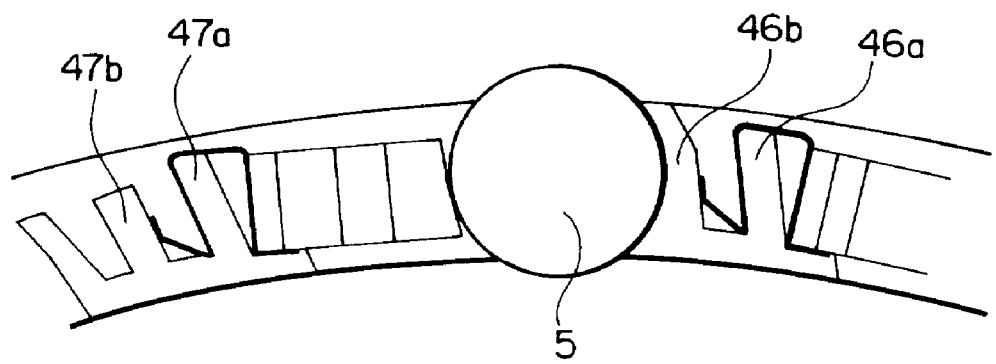
FIG. 10 is an explanatory view showing a roller inserted in the state of FIG. 9.

The two protruding portions 46a, 46b or 47a, 47b for respectively supporting the corresponding leaf springs 6 inside the second apertures 45a, 45b and 45c are formed to be inclined, as shown in FIG. 5.

A base portion 62 of each leaf spring 6 is bent from the outer diameter side toward the inner diameter side to wind on and pinch or nip one of the protruding portions 46a or 47a of the pole 46 or 47, as shown in FIG. 5, and is folded back outward at the base of the inner diameter so as to form a folded-back portion 63, and then presses and thrusts the other protruding portion 46b or 47b with pressure at the folded-back portion 63 so as to form a clip-shaped portion, which is supported by the pole portion 46 or 47. It should be noted that an accordion-formed leaf spring main portion 64 is cut away and omitted from FIG. 5.

Figure 11:
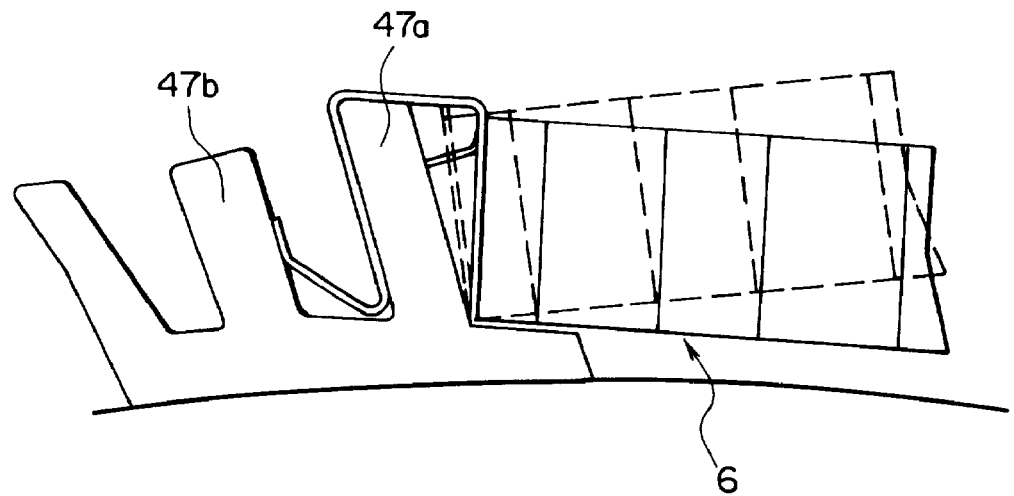
FIG. 11 is an explanatory view showing a changing direction of a pressing force which is caused by a change in setting a tongue portion of the leaf spring.
Figure 12:
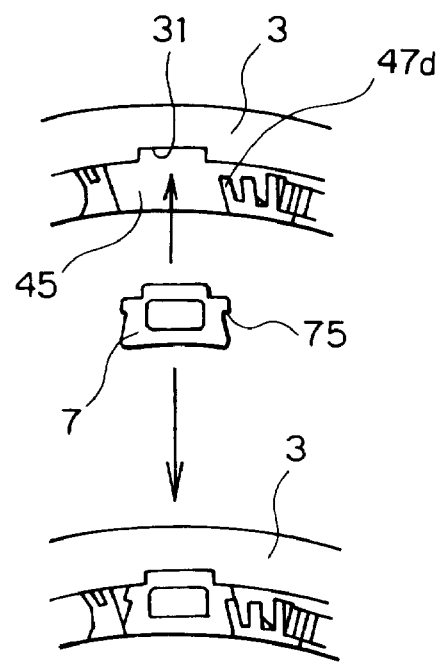
FIG. 12 is an explanatory view showing a way of assembling a block bearing in the retainer.
Figure 13:
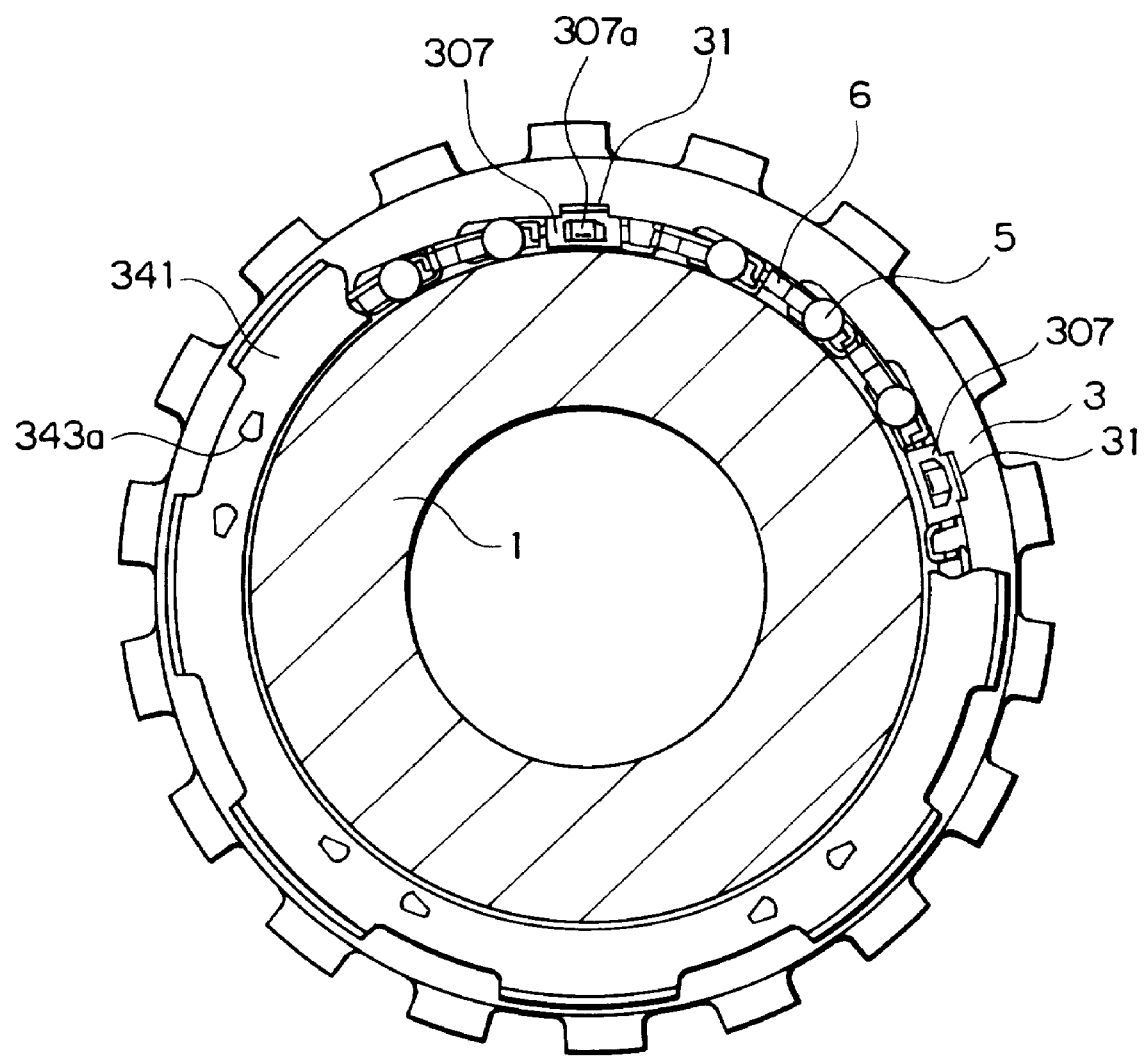
FIG. 13 is a front view showing a oneway clutch, partially cut-away, according to a second embodiment of the present invention.
Figure 14:
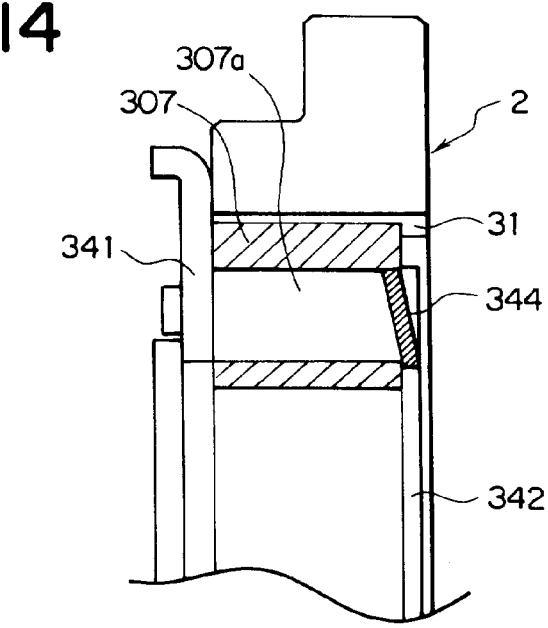
FIG. 14 is a cross-sectional view in the axial direction schematically showing the block bearing part of FIG. 13, in an enlarged manner.
Figure 15:
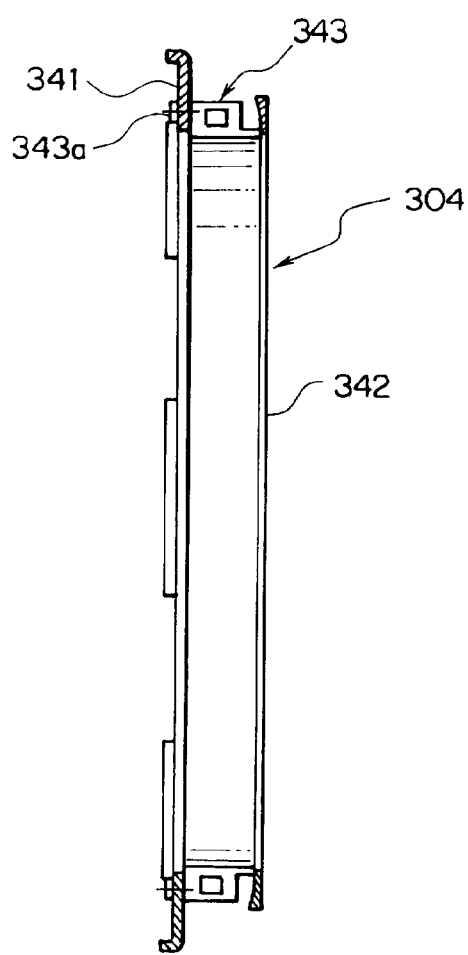
FIG. 15 is an enlarged cross-sectional view of the retainer of FIG. 13.
Figure 16:
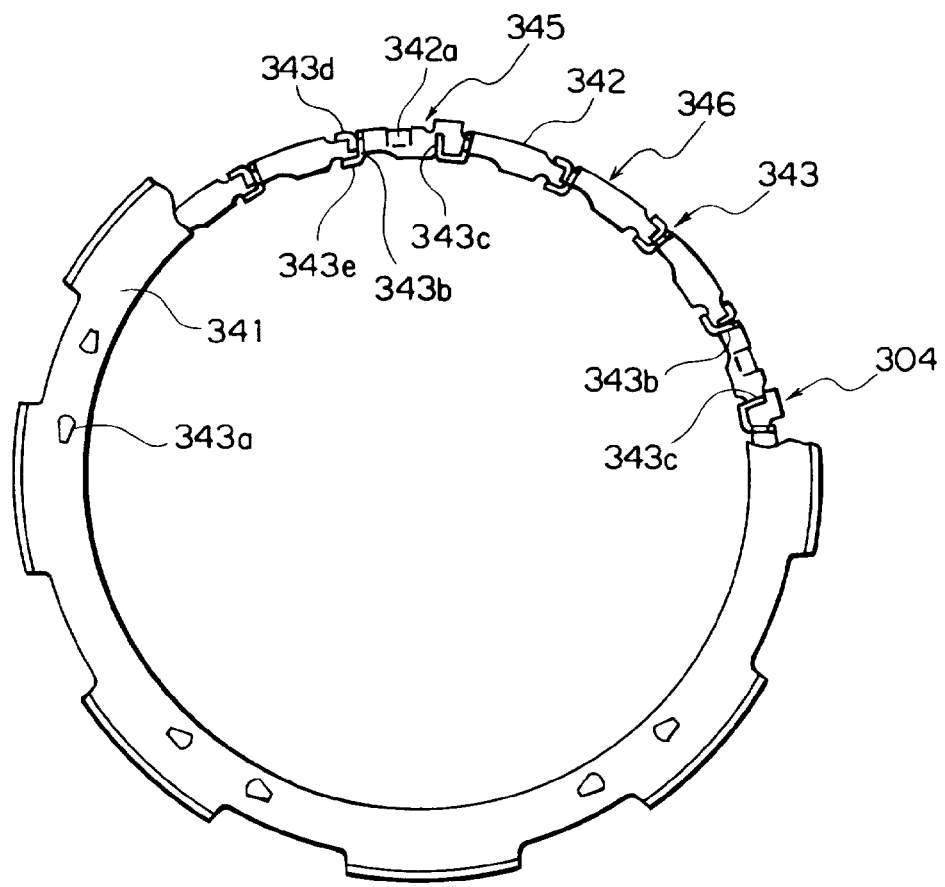
FIG. 16 is a front view for showing the retainer of FIG. 13, partially cut-away, in an enlarged manner.
Figure 17:
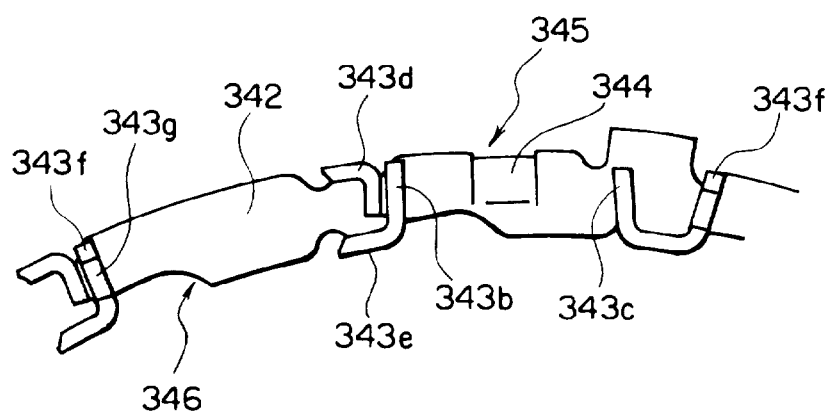
FIG. 17 is a partially enlarged view of the retainer shown in FIG. 16.

A connection portion 65 of the base 62 of the leaf spring to the wave-formed or accordion-formed leaf spring main portion 64 is partially cut away and is folded back at the central portion in the axial direction to form a tongue portion 66 which is a thrust portion thrust by one of the protruding portions 46a or 47a. The degree and the direction of a biasing force to the roller 5 can be adjusted, depending on the support of the folded-back portion 63 and the degree of thrust of the tongue portion 66, whereby a stable biasing force can be applied to the roller 5 serving as the torque transmitting member. FIG. 11 shows a changing pressing direction of the leaf spring caused by a change of an inclination of the tongue portion 66.

Moreover, since the radially protruding portions 46a, 46b; 47a, 47b; and 48a, 48b are formed to be inclined in the same direction, the shape of a die for molding the retainer can be simplified and the retainer 4 can be molded easily. That is, the die can be removed slantingly, and the recesses 46c, 48c for receiving the rollers can be formed by the tip end of the molding die without removing forcibly.

Next, a manner of assembling of the outer race-retaining assembly will be described specifically.

First, the leaf springs 6 and the rollers 5 are assembled with the retainer 4 which is integrally formed of plastic by injection molding, so as to form a retainer-roller assembly 2.

Next, the retainer-roller assembly is inserted laterally into the outer race 3. For this insertion, the radially protruding portions 43 of the retainer 4 are positioned correspondingly to the axial grooves 31 on the inner peripheral side of the outer race. Since it is arranged that the rollers 5 come to the respective cam surfaces 32 of the outer race in a state that the radially protruding portions 44 of the retainer 4 are fitted in the corresponding axial grooves 31 of the outer race 3, it is easy to assemble the retainer-roller assembly with the outer race. When the retainer 4 is rotated with respect to the outer race 3 only by a predetermined angle after the insertion, the radially protruding portions 43 of the retainer 4 face to be engaged with the stepped portion 33 of the outer race 3, so that the retainer-roller assembly is positioned in the axial direction with respect to the outer race 3. Also, since the radially protruding portions 44 of the retainer are positioned inside the stepped portion 33, the side face of the outer race and that of the retainer are on the same plane.

Since in this case the retainer 4 and the outer race 3 are in a predetermined positional relation, the block bearings 7 are then inserted from the inner diameter side of the retainer 4 through the respective first apertures 44, and the head 71 of each block bearing is fitted in the corresponding axial groove 31 of the outer race 3, as described above, so as to position and fix the retainer 4 in the circumferential direction.

Thus, the formation of the outer race-retainer assembly 2 is completed, and assembling of an inner member 1 with the outer race-retainer assembly 2 completes a oneway clutch.

In the case of a conventional metallic retainer, the block bearings are fitted in the retainer and the outer race and then caulking is effected on the side plates of the retainer. However, according to the present embodiment, only fitting or insertion of the block bearings into the retainer completes the process.

According to the present embodiment, block bearings each formed in a simple shape are used to be fitted in the retainer. Thus, it is possible to produce a oneway clutch having no backlash with respect to the outer race.

In the present embodiment, the elastic protruding portions for supporting the block bearings support the block bearings only from one side in the circumferential direction. However, the elastic protruding portions may be formed on both sides in the circumferential direction of the apertures for the block bearings in order to support block bearings from the both sides in the circumferential direction.

According to the present embodiment, a drag of the torque transmitting members generated when the inner race or outer race is rotated in a direction of idle rotation, i.e., in a non torque transmitting direction, can be suppressed to the minimum.

Also according to the present embodiment, the retaining performance of the torque transmitting members can be enhanced, and the pressing force by the springs to the torque transmitting members can be minimized.

Further, according to the present embodiment, it is possible to easily adjust or set the pressing direction of the torque transmitting members by forming a tongue portion on each transmitting member and pressing this tongue portion to the retainer.

Next, a second embodiment of the present invention will be described below with reference to FIGS. 13 to 17.

In the second embodiment, a retainer 304 is of a two component-structure of metal, in which a first retainer member, which is one of the two components, is a plate member provided with a first annular side portion 341 having a larger diameter than that of the basic circle of an outer race 2, while a second retainer member is made of a single plate which integrally comprises a second annular side portion 342 having a smaller diameter than that of the basic circle of the outer race 2, pole portions 343 extended in the axial direction, and claws 344 protruding into hollow portions of the block bearings 307. Some of the pole portions 343 of the second retainer member are extended through the first annular side portion 341 of the first retainer member and caulked thereto to form an assembly of the first retainer member and the second retainer member.

In the present embodiment, the pole portions 343 are originally formed by cutting a single plate existing on the same plane as the second annular side portion 342 into a predetermined form and bending the same. As a result, an outline of the second annular side portion 342 takes a special form corresponding to the form of the pole portion 343.

The block bearings 307 are, respectively, fitted in first apertures 345 which are corresponding to the axial grooves 31 on the inner peripheral side of the outer race 2 between adjacent pole portions 343, 343 in the circumferential direction. The pole portions 343b and 343c which support the block bearings 307 from both sides in the circumferential direction are respectively extended in the axial direction from the inner peripheral side of the annular side portion 342 of the second retainer member, and at the same time, extended in the radial direction to sandwich the block bearings 307 therebetween from both sides in the circumferential direction by plane contact.

In a part of the second annular side portion 342 facing the end face of each block bearing 307 in the axial direction, the above-mentioned claw 344 which is formed by bending a part of the second annular side portion 342 is inserted into a hollow portion 307a of the block bearing 307 in the axial direction so that the block bearing 307 is pressed to the outer race 2 outward in the radial direction.

Torque transmitting members 5 which are cylindrical roller members and biasing members 6 for biasing the torque transmitting members 5 to the torque transmitting positions are provided in the second apertures 346 which are parts other than that described above, between adjacent pole portions 343 in the circumferential direction.

A part of each pole portion 343, with which each torque transmitting member 5 is contacted to be retained, is formed by upper and lower pole portions 343d, 343e. In the present embodiment, the pole portions 343b and 343e are formed as the same single piece.

Also, each biasing member 6 is made of a leaf spring which is bent in an accordion form, and one end of the biasing member is latched in an aperture 343g formed on a pole portion 343f which faces the above-mentioned pole portions 343d and 343e out of the pole portions 343 in the circumferential direction. The other end of the biasing member 6 is brought into contact with the corresponding torque transmitting member 5 to bias the torque transmitting member 5 to a torque transmitting position, as described above.

According to the last mentioned embodiment, it is possible to form the pole portions of the retainer having a complicated structure from a single plate member for constituting one of the annular side members of the retainer, so as to provide a oneway clutch which can be manufactured in an easy manner and capable of securely positioning and centering the retainer without backlash.

According to the present invention, it is possible to provide a oneway clutch which can be assembled easily without backlash.

What is claimed is:

1. A oneway clutch comprising:

an inner member having a raceway on an outer periphery thereof;

an outer race member concentric with said inner member and having a predetermined number of cam surfaces on an inner periphery thereof;

torque transmitting members each provided between an outer peripheral raceway of said inner member and the outer race member to be displaced between a torque transmitting position on an outer race cam surface;

biasing members each biasing a corresponding torque transmitting member toward said torque transmitting position; and a retainer retaining said torque transmitting members and said biasing members;

wherein grooves extended in an axial direction are formed at predetermined positions on an inner peripheral side of said outer race member, and respective block bearings are fitted in said grooves through first apertures provided on said retainer corresponding to said grooves in order to position said retainer in a circumferential direction;

said retainer comprises a first annular side member, a second annular side member, and pole portions connecting said first annular side member and said second annular side member in the axial direction;

said pole portions, together with said first and second annular side members, define said first apertures and further define second apertures retaining said torque transmitting members and said biasing members; and each of predetermined pole portions out of said pole portions of said retainer is provided with at least two radially protruding portions to support a corresponding biasing member in the circumferential direction, each of said radially protruding portions is formed to be inclined in the circumferential direction, and each of said biasing members comprises a clip-shaped portion which bends around one of said radially protruding portions of the corresponding predetermined pole portion to pinch said one protruding portion and is fixed to the other of said radially protruding portions, and a tongue portion which is engaged with said one of said radially protruding portions to adjust the biasing condition.

2. A oneway clutch according to claim 1, wherein each of said biasing members is a leaf spring, each of said torque transmitting members is a roller, said leaf spring is folded back at a base of said tongue portion in an accordion-like form, and a tip end of said leaf spring is brought into contact with said roller to bias said roller.

3. A oneway clutch according to claim 2, wherein said tip end of said leaf spring has a recess corresponding to a form of said roller.

4. A oneway clutch according to claim 2, wherein one of said pole portions facing said roller has a recess shaped so as to embrace said roller.

5. A oneway clutch according to claim 1, wherein said retainer has an integral structure of plastic.

6. A oneway clutch comprising:

an inner member having a raceway on an outer periphery thereof;

an outer race member concentric with said inner member;

torque transmitting members each disposed between said inner member and said outer race member to be displaced between a torque transmitting position and a non torque transmitting position;

biasing members each biasing a corresponding torque transmitting member toward said torque transmitting position; and a retainer retaining said torque transmitting members and said biasing members;

wherein grooves extended in an axial direction are formed at predetermined positions on an inner peripheral side of said outer race member, and respective block bearings are fitted in said grooves through apertures provided on said retainer correspondingly to said grooves in order to position said retainer in a circumferential direction, said block bearings having apertures in the axial direction;

said retainer comprises a first annular side member, a second annular side member, and a plurality of pole portions connecting said first annular side member and said second annular side member in the axial direction;

predetermined pairs of adjacent pole portions, together with said first and second annular side members, define said apertures for mounting said block bearings correspondingly to said grooves of said outer race;

radially protruding portions are formed on said paired pole portions to be outwardly extended in a radial direction;

sides of the block bearings contact the radially protruding portions of the corresponding paired pole portions;

an elastic claw portion is formed on at least one of said first and second annular side members of said retainer; and said elastic claw portion is bent when said block bearings are assembled in the retainer so as to support said block bearings after they are assembled.

7. A oneway clutch according to claim 6, wherein said elastic claw portion is engaged with inner walls of said apertures of said block bearings so as to press said block bearings to said grooves of said outer race member.

8. A oneway clutch according to claim 6, wherein said retainer is made of metallic plate.

9. A oneway clutch comprising:

an inner member having a raceway on an outer periphery thereof;

an outer race member concentric with said inner member and having a predetermined number of cam surfaces on an inner periphery thereof;

torque transmitting members each provided between an outer peripheral raceway of said inner member and the outer race member to be displaced between a torque transmitting position and a non torque transmitting position on an outer race cam surface;

biasing members each biasing a corresponding torque transmitting member toward said torque transmitting position; and a retainer retaining said torque transmitting members and said biasing members;

wherein grooves extended in an axial direction are formed at predetermined positions on an inner peripheral side of said outer race member, and respective block bearings are fitted in said grooves through first apertures provided on said retainer correspondingly to said grooves in order to position said retainer in a circumferential direction;

said retainer comprises a first annular side member, a second annular side member, and pole portions connecting said first annular side member and said second annular side member in the axial direction;

said pole portions, together with said first and second annular side members, define said first apertures and further define second apertures retaining said torque transmitting members and said biasing members;

predetermined pole portions out of said pole portions of said retainer are fixedly provided with said biasing members; and each of said biasing members is a leaf spring, each of said torque transmitting members is a roller, said leaf spring is folded back in an accordion-like form, a tip end of said leaf spring has a recess corresponding to a form of said roller and the recess is in contact with said roller to bias said roller.

10. A oneway clutch according to claim 9, wherein one of said pole portions facing said roller has a recess shaped so as to embrace said roller.

11. A oneway clutch according to claim 10, wherein said retainer has an integral structure of plastic.

12. A oneway clutch according to claim 9, wherein said retainer has an integral structure of plastic.

13. A oneway clutch comprising:

an inner member having a raceway on an outer periphery thereof;

an outer race member concentric with said inner member;

torque transmitting members each disposed between the outer peripheral raceway of said inner member and said outer race member to be displaced between a torque transmitting position and a non torque transmitting position;

biasing members each biasing a corresponding torque transmitting member toward said torque transmitting position; and a retainer retaining said torque transmitting members and said biasing members;

wherein grooves extended in an axial direction are formed at predetermined positions on an inner peripheral side of said outer race member, and respective block bearings are fitted in said grooves through apertures provided on said retainer correspondingly to said grooves in order to position said retainer in a circumferential direction;

said retainer is integrally made of plastic or synthetic resin and comprises a first annular side member, a second annular side member, and a plurality of pole portions connecting said first annular side member and said second annular side member in the axial direction;

predetermined pairs of adjacent pole portions, together with said first and second annular side members, define said apertures for mounting said block bearings correspondingly to said grooves of said outer race;

each said block bearing is formed with a head portion which is so sized that said head portion can be passed through the corresponding aperture from radially inside and fitted in the corresponding groove of said outer race;

a radially protruding elastic portion is formed to be radially outwardly extended on at least one pole portion of each said pair; and said radially protruding elastic portion is bent when a block bearing is passed through the corresponding aperture from radially inside and supports said block bearing with its head fitted in the corresponding groove of said outer race.

14. A oneway clutch according to claim 13, wherein each said block bearing is further formed with a shoulder portion projected in a circumferential direction and being in contact with an inner peripheral surface of said outer race.

15. A oneway clutch according to claim 13, wherein a stepped portion is formed on an inner side of said shoulder portion and said protruding elastic portion presses said stepped portion.

* * * * *

UNITED STATES PATENT AND TRADEMARK OFFICE
CERTIFICATE OF CORRECTION

PATENT NO.   : 6,092,636
DATED        : July 25, 2000
INVENTOR(S)  : Kazuhiko Muramatsu and Hirohumi Shirataki It is certified that error appears in the above-identified patent and that said Letters Patent is hereby corrected as shown below:

On the title page:
The inventorship should read --[75] Inventors: Kazuhiko Muramatsu and Hirohumi Shirataki, both of Fukuroi, Japan.--

[30] Foreign Application Priority Data should include
--Aug. 7, 1997 [JP] Japan.................9-224453--.

[56] References cited should include the following additional U.S. Patent Documents
--2,843,238   7/58    Rozner......................192/45
  4,422,537   12/83   Ritter et al..................192/45
  5,046,229   9/91    Lederman....................192/45
  5,279,399   1/94    Riggle........................192/45
  5,651,438   7/97    Papania.......................192/45--.

Signed and Sealed this

Seventh Day of August, 2001

Attest:

NICHOLAS P. GODICI
Attesting Officer    Acting Director of the United States Patent and Trademark Office